US010892967B2

(12) United States Patent
Filsfils et al.

(10) Patent No.: US 10,892,967 B2
(45) Date of Patent: Jan. 12, 2021

(54) END-TO-END PATH DELAY MEASUREMENTS IN A NETWORK

(71) Applicant: Cisco Technology, Inc., San Jose, CA (US)

(72) Inventors: Clarence Filsfils, Brussels (BE); Amila Pradeep Kumara Tharaperiya Gamage, Kanata (CA); Rakesh Gandhi, Stittsville (CA); Darren Dukes, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 16/229,983

(22) Filed: Dec. 21, 2018

(65) Prior Publication Data
US 2020/0204469 A1    Jun. 25, 2020

(51) Int. Cl.
*H04W 72/04* (2009.01)
*H04L 12/26* (2006.01)
*H04L 12/721* (2013.01)

(52) U.S. Cl.
CPC ......... *H04L 43/0858* (2013.01); *H04L 43/10* (2013.01); *H04L 45/123* (2013.01); *H04L 45/34* (2013.01)

(58) Field of Classification Search
CPC ... H04L 43/0858; H04L 43/10; H04L 45/123; H04L 45/34
See application file for complete search history.

(56) References Cited

U.S. PATENT DOCUMENTS

| | | | |
|---|---|---|---|
| 8,670,326 B1 | 3/2014 | Balasubramanian et al. | |
| 9,379,956 B2 | 6/2016 | Xiao et al. | |
| 10,110,479 B1* | 10/2018 | Ramachandran | ....... H04L 45/50 |
| 2005/0081116 A1* | 4/2005 | Bejerano | ............. H04L 41/0677 |
| | | | 714/47.2 |
| 2012/0106339 A1 | 5/2012 | Mishra et al. | |

(Continued)

OTHER PUBLICATIONS

D. Frost, et al., "Packet Loss and Delay Measurement for MPLS Networks", Internet Engineering Task Force (IETF), ISSN: 2070-1721, RFC 6374, Sep. 2011, 52 pages.

*Primary Examiner* — Hassan Kizou
*Assistant Examiner* — Mahbubul Bar Chowdhury
(74) *Attorney, Agent, or Firm* — Edell, Shapiro & Finnan, LLC

(57) ABSTRACT

Techniques are provided for determining end-to-end path delay measurements. In one embodiment, a method includes identifying equal-cost multi-path (ECMP) sections comprising at least two different ECMP paths in a network comprising a plurality of nodes. In response to receiving a request to determine a delay measurement for end-to-end paths from an ingress node to an egress node through the network, the method includes determining sets of ECMP sections that are between the ingress node and the egress node and determining a plurality of paths through each set of ECMP sections. The method includes measuring delay for each of the plurality of paths using probe packets and determining delay measurements for all end-to-end paths. The delay measurements for end-to-end paths include a first subset including measured delays from the probe packets and a second subset calculated using combinations of measured delays.

21 Claims, 12 Drawing Sheets

(56) References Cited

U.S. PATENT DOCUMENTS

| | | | |
|---|---|---|---|
| 2013/0272205 A1* | 10/2013 | Ueda | H04W 56/0085 370/328 |
| 2014/0270754 A1* | 9/2014 | Loehr | H04B 10/0795 398/25 |
| 2015/0319076 A1* | 11/2015 | Vasseur | H04L 43/0852 370/238 |
| 2016/0248680 A1* | 8/2016 | Filsfils | H04L 47/122 |
| 2018/0295049 A1* | 10/2018 | Agarwal | H04L 45/00 |
| 2019/0335405 A1* | 10/2019 | Wang | H04W 68/005 |

* cited by examiner

| Determination | Path Number | End-to-End Paths | Delay |
|---|---|---|---|
| Measured | Path 1 | 2-3-6-7-9 | $D_2$ |
| Measured | Path 2 | 2-3-6-8$_1$-9 | $D_1(1,1)$ |
| Calculated | Path 3 | 2-3-6-8$_2$-9 | $D_1(2,2) - D_1(2) + D_1(1)$ |
| Calculated | Path 4 | 2-4-6-7-9 | $D_2 - D_1(1) + D_1(2)$ |
| Calculated | Path 5 | 2-4-6-8$_1$-9 | $D_1(1,1) - D_1(1) + D_1(2)$ |
| Measured | Path 6 | 2-4-6-8$_2$-9 | $D_1(2,2)$ |
| Calculated | Path 7 | 2-5-6-7-9 | $D_2 - D_1(1) + D_1(3)$ |
| Calculated | Path 8 | 2-5-6-8$_1$-9 | $D_1(1,1) - D_1(1) + D_1(3)$ |
| Calculated | Path 9 | 2-5-6-8$_2$-9 | $D_1(2,2) - D_1(2) + D_1(3)$ |

```
Input: Graph G = (V, E); positive edge lengths {l_e : e ∈ E}; source
vertex s ∈ V.
Output: For all vertices u reachable from s, dist(u) is set to the
distance from s to u and prev(u) consists of upstream nodes from which
u can be reached.
``` for all u ∈ V :

dist(u) = ∞

/* Below is a list to keep multiple upstream nodes when there are ECMP paths */ prev(u) = []

dist(s) = 0

H = makequeue (V)   /*using dist-values as keys */ while H is not empty:

u = deletemin(H)

for all edges (u, v) ∈ E:

if dist(v) > dist(u) + l(u, v):

dist(v) = dist(u) + l(u, v)

prev(v) = [u]

decreasekey(H, v)

else if dist(v) == dist(u) + l(u, v):

/*Found an ECMP path*/ prev(v) = [prev(v), u]

FIG.8

900 

```
For each ECMP section j ∈ [1, J]:

If there is an Ending node E of any ECMP section in any set of
    ECMP sections such that E is between E(j) and S(j+1) of the
    current (i.e., kth) set of ECMP sections:

If j == 1 and j != J:        /* First ECMP section */
            For each P(1,m), m ∈ [1, M₁]:
                Add ECMP path to E via Q_k(m) to the set;

Else if j < J:
            For each P(j,m), m ∈ [1, M_j]:
                Add ECMP path to E via Q_k(1+(m%M₁), 1+(m%M₂),...,
                1+(m%M_{j-1}), m) to the set;

Else if j == J:              /* Last ECMP section */
            For each P(j,m), m ∈ [1, M_J]:
                Add ECMP path to E via Q_k(1+(m%M₁), 1+(m%M₂),...,
                1+(m%M_{j-1}), m) to the set;

Add ECMP path to destination node via Q_k(1+(m%
                M₁), 1+(m%M₂),..., 1+(m%M_{j-1}), m) to the set;

Else:
        If j == 1 and j != J:        /* First ECMP section */
            For each P(1,m), m ∈ [1, M₁]:
                Add ECMP path Q_k(m) to the set;

Else if j < J:
            For each P(j,m), m ∈ [1, M_j]:
                Add ECMP path Q_k(1+(m%M₁), 1+(m%M₂),..., 1+(m%M_{j-
                1}), m) to the set;

Else if j == J:              /* Last ECMP section */
            For each P(j,m), m ∈ [1, M_J]:
                Add ECMP path to destination node via Q_k(1+(m%
                M₁), 1+(m%M₂),..., 1+(m%M_{j-1}), m) to the set;
```

FIG.9

END-TO-END PATH DELAY MEASUREMENTS IN A NETWORK

TECHNICAL FIELD

The present disclosure relates to network delay measurement.

BACKGROUND

Segment-routing (SR) is a new technology that greatly simplifies network operations and makes networks Software Defined Network (SDN)-friendly. SR is applicable to both Multiprotocol Label Switching (MPLS), i.e., SR-MPLS, and Internet Protocol version 6 (IPv6), i.e., SRv6, data planes. SR policies steer traffic through user-defined paths using segment lists, which consist of segment identifiers, for traffic engineering (TE) purposes. Traffic flow through these paths are expected to satisfy certain end-to-end delay constraints, as defined in customer Service Level Agreements (SLAs). For example, services such as tele-medicine, online gaming, stock market trading, and many other mission critical applications have strict end-to-end delay bounds. Furthermore, SR technology can be used with network slicing techniques to provide end-to-end latency services in 5G networks. When end-to-end delay experienced by traffic violates the SLA-defined delay constraints, such violations are expected to be detected and corrected using another path within a sub-second interval. Therefore, end-to-end delays experienced by traffic steered using SR policies is monitored to ensure satisfaction of customer SLAs.

BRIEF DESCRIPTION OF THE DRAWINGS

FIG. 7 is a table illustrating determination of all end-to-end path delay measurements using measured and calculated paths, according to an example embodiment.

FIG. 8 is a diagram of an example algorithm for detecting one or more ECMP sections in a network, according to an example embodiment.

FIG. 9 is a diagram of an example algorithm for determining the ECMP paths through one or more ECMP sections in a network, according to an example embodiment.

DESCRIPTION OF EXAMPLE EMBODIMENTS

Overview

Figure 1:
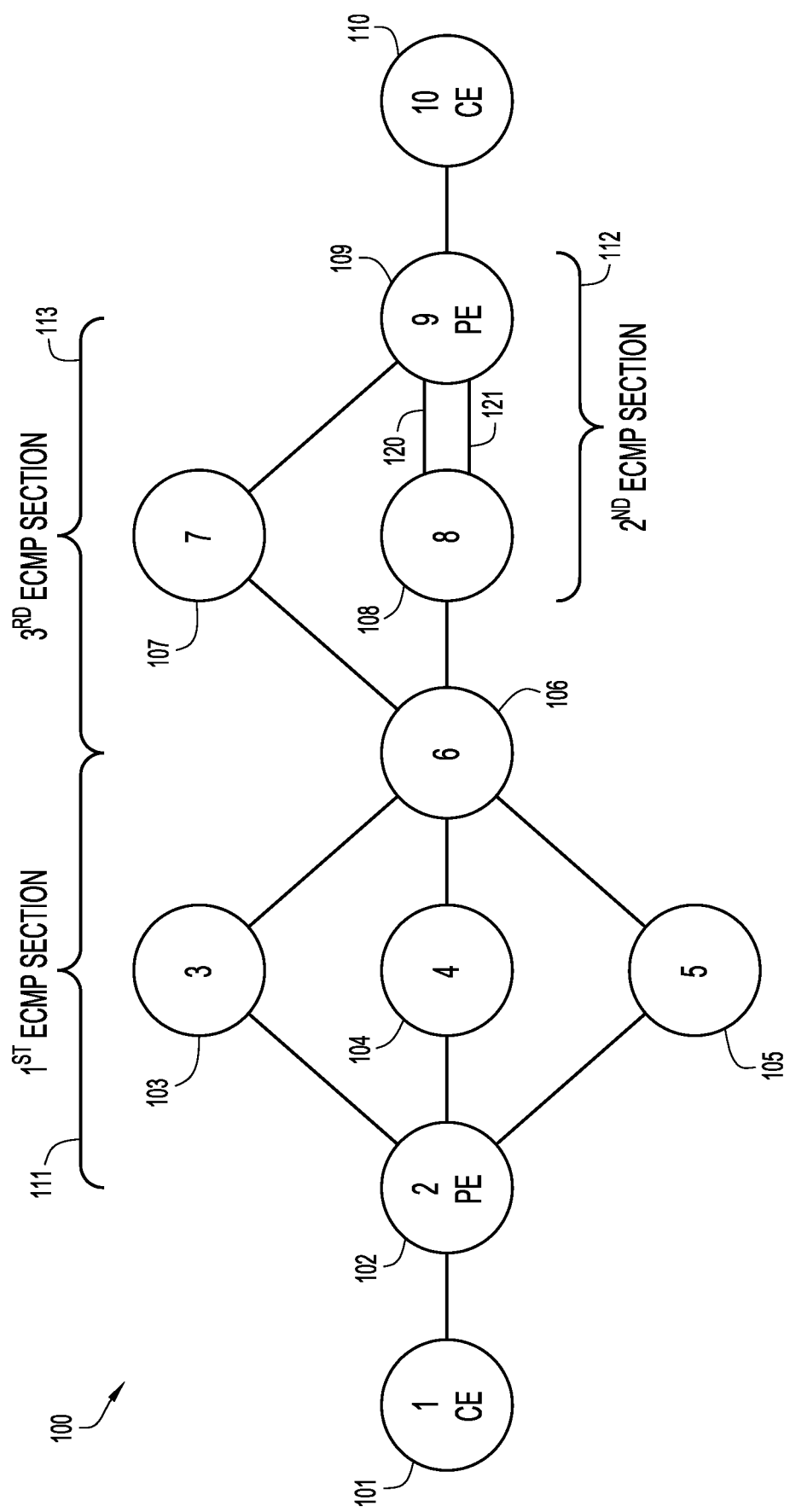
FIG. 1 is a diagram illustrating a network in which techniques for end-to-end path delay measurements may be implemented, according to an example embodiment.

Presented herein are techniques for determining end-to-end path delay measurements in computer networks. In an example embodiment, a method includes identifying one or more equal-cost multi-path (ECMP) sections comprising at least two different ECMP paths in a network comprising a plurality of nodes. In response to receiving a request to determine a delay measurement for end-to-end paths from an ingress node to an egress node through the network, the method further includes determining one or more sets of ECMP sections that are between the ingress node and the egress node in the network. The method also includes determining a plurality of paths through each of the one or more sets of ECMP sections, where a number of the plurality of paths is less than a number of the end-to-end paths. The method includes measuring delay for each path of the plurality of paths using probe packets and determining delay measurements for all end-to-end paths from the ingress node to the egress node. The delay measurements for all end-to-end paths include a first subset of delay measurements comprising the measured delays from the probe packets and a second subset of delay measurements calculated using different combinations of measured delays for the paths of the plurality of paths.

Example Embodiments

An SR policy is a framework that enables instantiation of an ordered list of segments on a node for implementing a source routing policy with a specific intent for traffic steering from that node. SR policies as defined in Internet Engineering Task Force (IETF) Segment Routing Policy for Traffic Engineering publication, available at tools.ietf.org/html/draft-filsfils-spring-segment-routing-policy, are used to steer traffic through a specific, user-defined path. One typical customer requirement is to determine end-to-end path delay measurements, such as minimum delay, maximum delay, and/or average delay, for traffic steered using an SR policy. To calculate these end-to-end path delay metrics, end-to-end delay over every possible equal-cost multi-path (ECMP) path for segment lists configured in the SR policy should be measured. However, the number of ECMP paths available for a segment list increases exponentially with the number of ECMP sections (i.e., two nodes with at least two ECMP paths between them) in series in the path specified by the segment list.

When the number of ECMP paths is large, it takes a long time to measure delays over every end-to-end path because the required number of delay measurements increases exponentially with the number of ECMP sections in the end-to-end path. Therefore, calculating the end-to-end delay metrics by measuring end-to-end delay of every ECMP path does not scale. For example, if an SR policy has a segment list with three ECMP sections, where each ECMP section has 128 ECMP paths, there are 128×128×128=2,097,152 total end-to-end paths. To measure end-to-end delay over all of these paths would take at least 17 minutes due to platform limits for punting received packets (e.g., 2000 packets per second on a router). As a result, changes to end-to-end delay metrics cannot be determined or detected quickly using conventional delay measurement techniques.

According to the techniques for determining end-to-end path delay measurements presented herein, the required number of delay measurements increases linearly, rather than exponentially, with the number of ECMP sections in the end-to-end path. As a result, the time required to determine end-to-end delay over all end-to-paths is significantly reduced compared with the conventional technique. For example, if applying the same SR policy that has a segment list with three ECMP sections, where each ECMP section has 128 ECMP paths, using the techniques presented herein there are only 128+128+128=384 total end-to-end paths that need to be measured (compared with the 2,097,152 paths in the conventional example above). Thus, the techniques provided herein according to the example embodiments are scalable and allow end-to-end path delay metrics to be calculated frequently to ensure that SR policies satisfy the required delay constraints.

Referring now to FIG. 1, a network 100 in which techniques for determining end-to-end path delay measurements may be implemented is shown according to an example embodiment. For example, in some embodiments, network 100 may be an SR-MPLS or SRv6 network. In the example embodiments, one or more paths through network 100 may be ECMP paths or non-ECMP paths. The term "atomic path" is defined herein and in the claims to mean an end-to-end path that includes non-ECMP paths and/or up to one ECMP path of each ECMP section.

The "atomic path" (i.e., end-to-end path) segment list is built as a list of adjacency or prefix segment identifiers (SIDs) of each hop along the path by the headend node or router of the SR policy. The segment list of the atomic path or part of the atomic path may then be used to direct the performance measurement probe messages along the specific path in the segment routing network. This allows measurement of the delay of the path in a deterministic way. When there is a change in the network topology, the segment list is dynamically re-computed using the updated topology database by the headend node or router.

The Key of the "atomic path" (i.e., end-to-end path) may be represented as a list of IPv4 or IPv6 address of each hop (e.g., a link or node) along the path. The Key may then be used to communicate information about the performance delay measurement of the end-to-end path via telemetry and other means of notifications. The Key allows storage of the path delay measurement information in a consistent manner in the network.

In this embodiment, network 100 includes a plurality of network elements or nodes, including a first customer edge node 101, an ingress node 102, a first transit node 103, a second transit node 104, a third transit node 105, a fourth transit node 106, a fifth transit node 107, a sixth transit node 108, an egress node 109, and a second customer edge node 110. In this embodiment, customer edge nodes 101, 110 may be a network element (e.g., a router) that is located on a customer's premises that provides an interface to/from a provider's core network. For example, in this embodiment, the provider's core network may be represented by ingress node 102, first transit node 103, second transit node 104, third transit node 105, fourth transit node 106, fifth transit node 107, sixth transit node 108, and egress node 109 of network 100.

In various embodiments, nodes or network elements of network 100 may be endpoints of any of a variety of types, such as routers, servers, switches, data storage devices, gateways, as well as networking appliances, such as firewalls, intrusion detection systems, etc. The endpoints may be physical, virtual (e.g., implemented in software), or a combination of both. In an example embodiment, ingress node 102 and egress node 109 may be routers that are configured to route packets through network 100, including routing packets between first customer edge node 101 and second customer edge node 110.

In the present embodiments, SR network (e.g., network 100) as an example may employ ECMP routing techniques to forward packets through the network, including through multiple ECMP sections, which include at least two ECMP paths between two nodes. The techniques presented herein for determining end-to-end path delay measurements, include identifying one or more ECMP sections in the network topology. For example, in some embodiments a modified version of a Constrained Shortest Path First (CSPF) algorithm may be used to identify the ECMP sections in the network topology. An example of a modified CSPF algorithm 800 that may be used to identify the ECMP sections is shown in FIG. 8.

Referring back to FIG. 1, in this embodiment, network 100 includes three ECMP sections, including a first ECMP section 111, a second ECMP section 112, and a third ECMP section 113. First ECMP section 111 includes multiple ECMP paths between ingress node 102 and fourth transit node 106. For example, first ECMP section 111 includes a first ECMP path that includes ingress node 102, first transit node 103, and fourth transit node 106; a second ECMP path that includes ingress node 102, second transit node 104, and fourth transit node 106; and a third ECMP path that includes ingress node 102, third transit node 105, and fourth transit node 106.

In this embodiment, second ECMP section 112 includes multiple ECMP paths between sixth transit node 108 and egress node 109, including a first ECMP path that includes a first or top link 120 between sixth transit node 108 and egress node 109 and a second ECMP path that includes a second or bottom link 121 between sixth transit node 108 and egress node 109. Third ECMP section 113 includes multiple ECMP paths between fourth transit node 106 and egress node 109, including a first ECMP path that includes fourth transit node 106, fifth transit node 107, and egress node 109, and a second ECMP path that includes fourth transit node 106, sixth transit node 108, and egress node 109.

The techniques for determining end-to-end path delay measurements according to the example embodiments utilize a unique set of atomic and parts of atomic paths over which delays need to be measured. In the example embodiments, the number of paths in the set increases linearly (i.e., thus, scalable) with the number of ECMP sections, as opposed to increasing exponentially in the conventional technique. In the example embodiments, the paths in the set of paths start from the headend router (e.g., ingress node 102) where the SR policy has been configured. This results in several benefits provided by the present techniques. For example, the transit nodes in the path (e.g., one or more of transit nodes 103, 104, 105, 106, 107, 108 shown in FIG. 1) specified by a segment list do not have to create and maintain Performance Measurement (PM) sessions (i.e., stateless at the transit nodes). Also, additional protocol extensions are not needed to exchange delay measurements among the nodes. Additionally, the example embodiments allow existing PM infrastructure to be used without changes.

Figure 2:
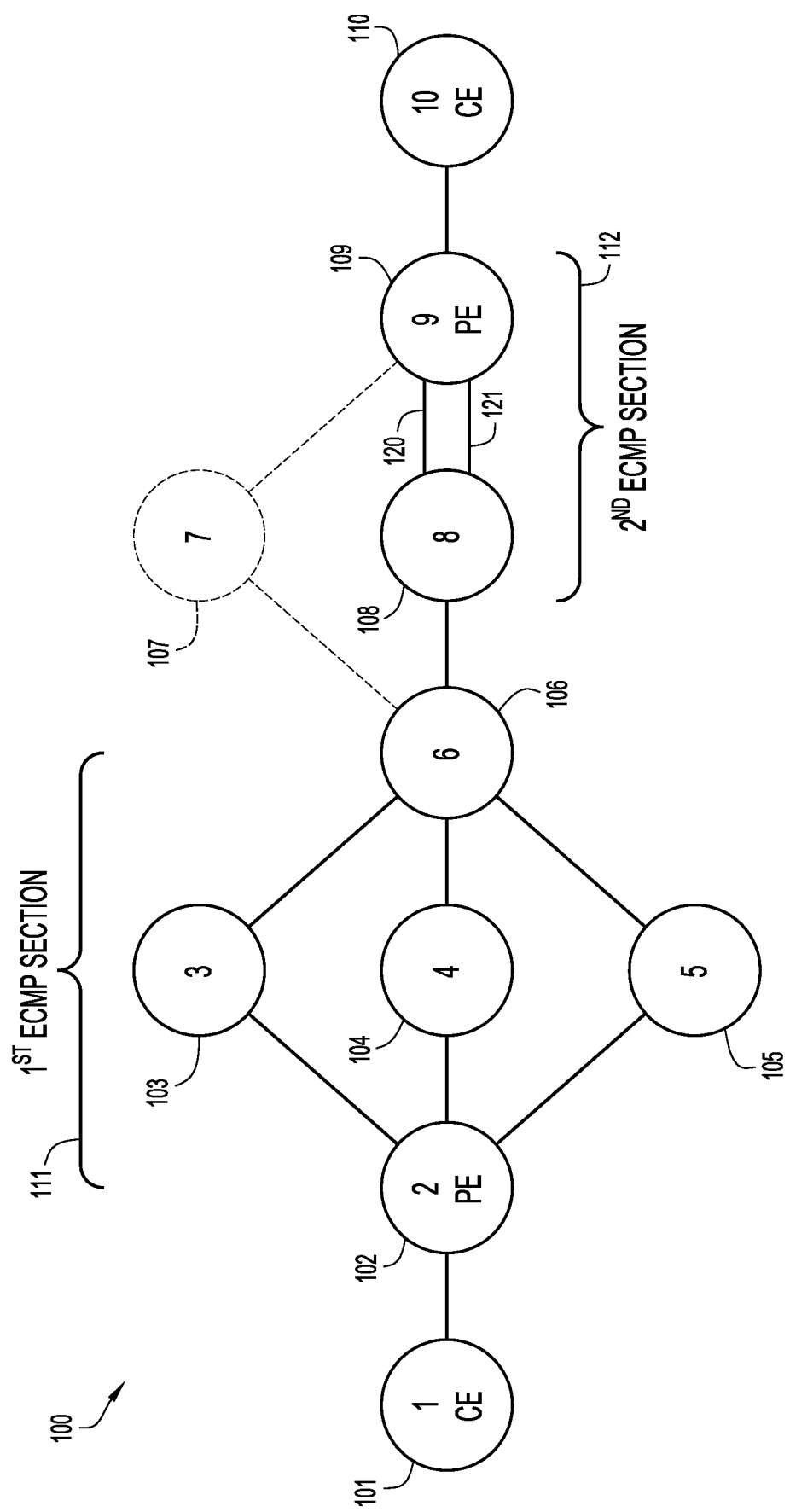
FIG. 2 is a diagram illustrating a first set of Equal Cost Multi-Path (ECMP) sections that are in series in a network, according to an example embodiment.

Referring now to FIG. 2, when a request is made to determine end-to-end delay measurements for a path specified by a segment list (e.g., SR policy configured on ingress node 102 with a destination on egress node 109), one or more sets of ECMP sections in the network topology are determined based on the results from executing the modified CSPF algorithm 800, described above. These sets of ECMP sections must satisfy two conditions: (1) none of the ECMP sections may have nested ECMP sections within them, and (2) ECMP sections in a set of ECMP sections are in series over the end-to-end path specified by the segment list.

According to the techniques presented herein, therefore, any of the ECMP paths between two nodes must not consist of other ECMP sections (i.e., must not include nested ECMP sections). As a result, because second ECMP section 112 is nested within third ECMP section 113, third ECMP section 113 may be decomposed to eliminate the ECMP path that includes second ECMP section 112. Therefore, third ECMP section 113, once decomposed, includes the first ECMP path through fourth transit node 106, fifth transit node 107, and egress node 109.

As shown in FIG. 2, network 100 includes a first set of ECMP sections that are between ingress node 102 and fourth transit node 106 (i.e., first ECMP section 111) and between sixth transit node 108 and egress node 109 (i.e., second ECMP section 112). In this embodiment, first set of ECMP sections includes two ECMP sections in series, first ECMP section 111 and second ECMP section 112.

Figure 3:
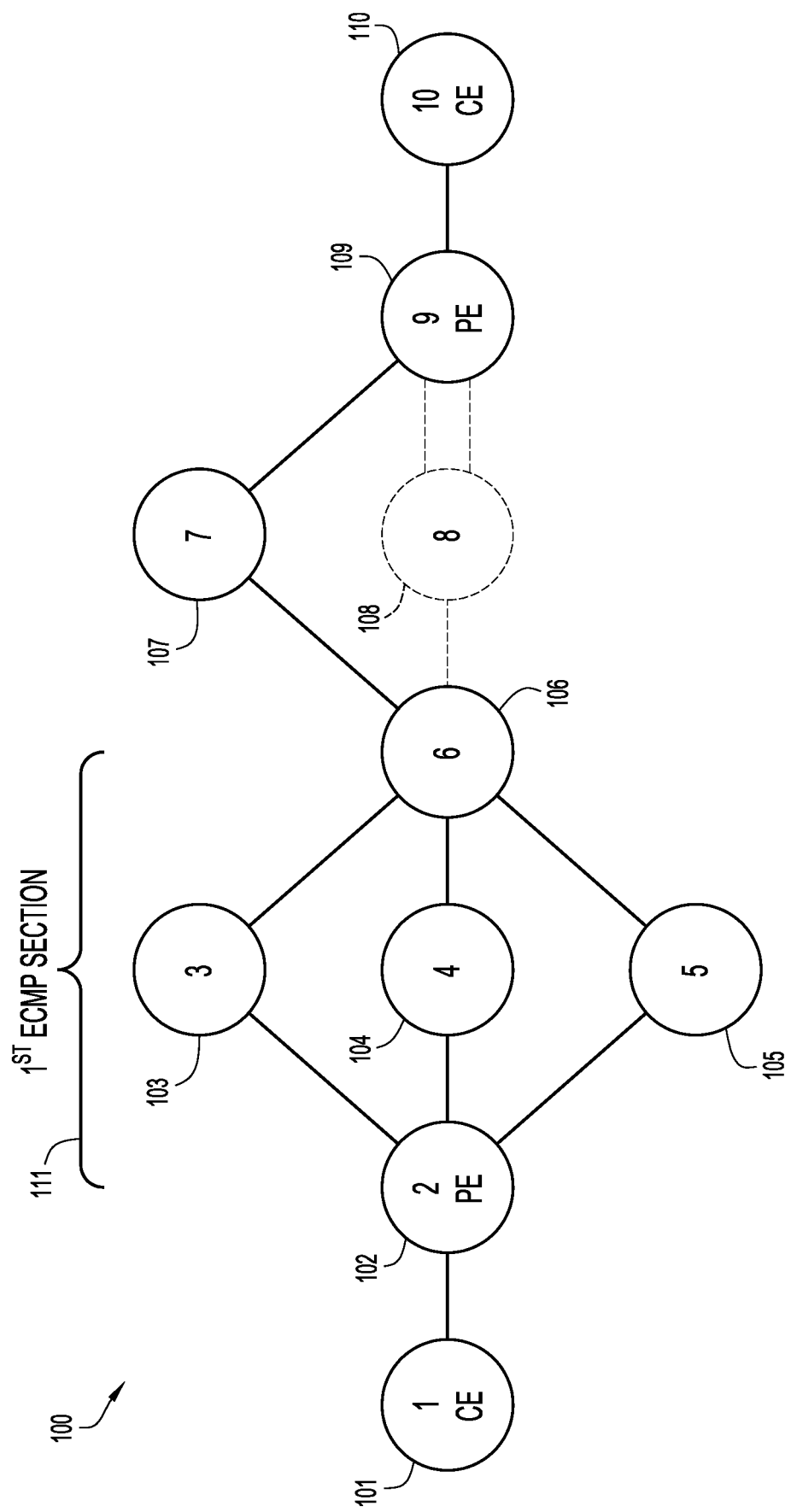
FIG. 3 is a diagram illustrating a second set of ECMP sections that are in series in a network, according to an example embodiment.

Referring now to FIG. 3, network 100 also includes a second set of ECMP sections comprising only one ECMP section between ingress node 102 and fourth transit node 106 (i.e., first ECMP section 111).

Next, paths through each set of ECMP sections determined as shown in FIGS. 2 and 3 are determined and delay measurements are measured for each of the paths. Paths in each set of ECMP sections are selected using an algorithm 900, as shown in FIG. 9. When algorithm 900 is executed, it finds paths that need to be measured for each set of ECMP sections (e.g., first set of ECMP sections shown in FIG. 2 and second set of ECMP sections shown in FIG. 3) and adds those paths to the set of paths for each of the sets of ECMP sections. All of these paths will start from the headend router (e.g., ingress node 102) where the SR policy is configured. The selected paths are encoded using adjacency-segment identifiers (SIDs) (optionally, using prefix-segment identifiers when there is no more than one ECMP path), and for each of these paths a PM session is created at the headend router (e.g., ingress node 102). Each PM session measures delay over a path using probe packets, as defined in IETF RFC 6374 Packet Loss and Delay Measurement for MPLS Networks publication, available at tools.ietf.org/html/rfc6374, the contents of which are incorporated by reference. In other embodiments, probe messages as defined in, but not limited to, IETF RFC 4656 for One-Way Active Measurement Protocol (OWAMP) and/or IETF RFC 5357 for Two-Way Active Measurement Protocol (TWAMP), may be used instead of RFC 6374.

Figure 4:
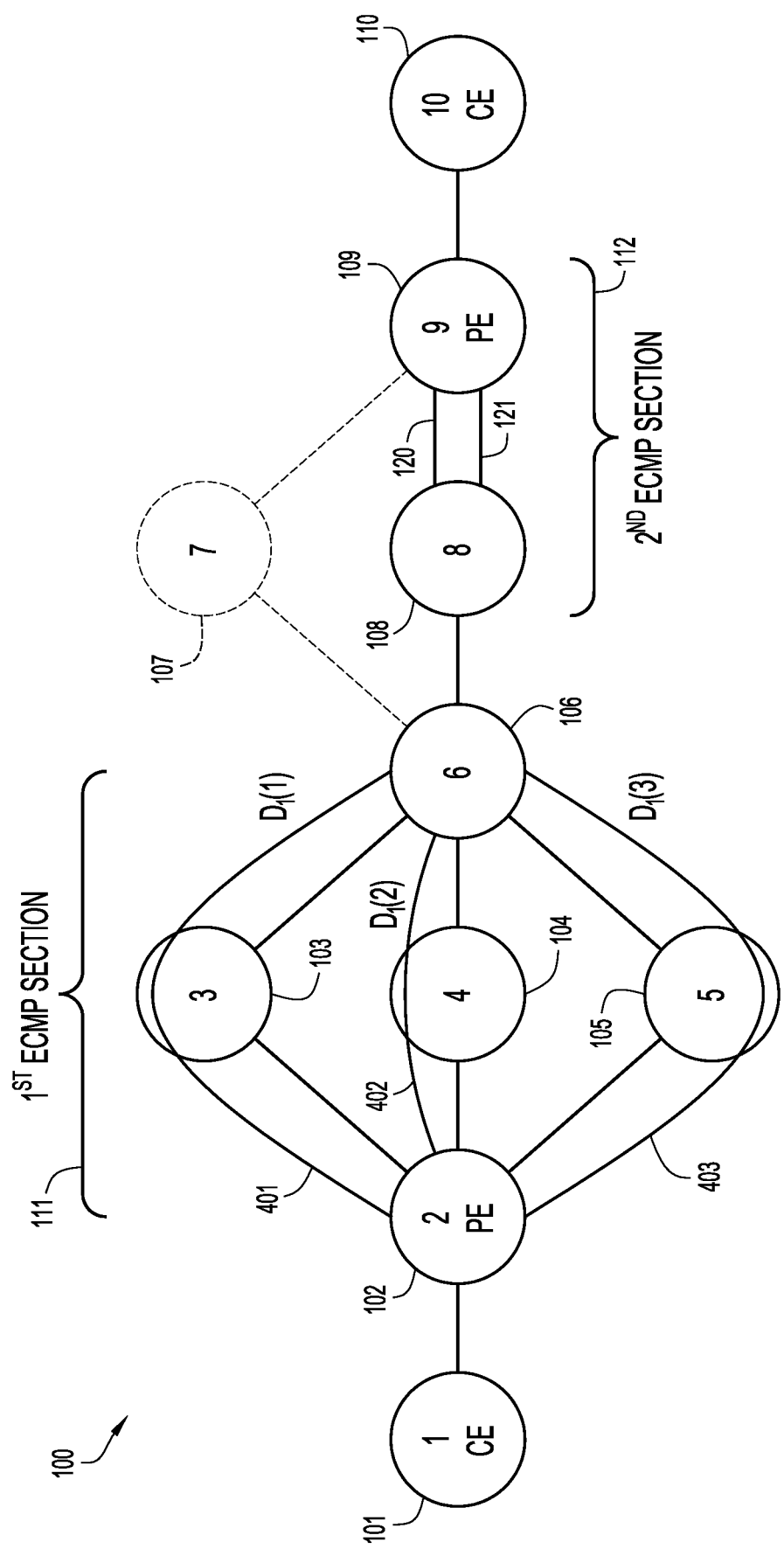
FIG. 4 is a diagram illustrating measurement of delays over ECMP paths of a first ECMP section, according to an example embodiment.

For example, as shown in FIG. 4, first set of ECMP sections includes a first path 401 over ingress node 102, first transit node 103, and fourth transit node 106 (e.g., segment list <24123, 24136>), a second path 402 over ingress node 102, second transit node 104, and fourth transit node 106 (e.g., segment list <24124, 24146>), and a third path 403 over ingress node 102, third transit node 105, and fourth transit node 106 (e.g., segment list <24125, 24156>).

Delays over each of these paths may be measured using probe packet, as described above. Delay over a path is determined from a timestamp at an ingress interface of the last node on the path subtracted from a timestamp at an egress interface of the headend node. For example, using probe packets, delay may be measured over each of first path 401, second path 402, and third path 403 through first ECMP section 111. In this embodiment, measured delay for first path 401 is $D_1(1)$, measured delay for second path 402 is $D_1(2)$, and measured delay for third path 403 is $D_1(3)$.

Figure 5:
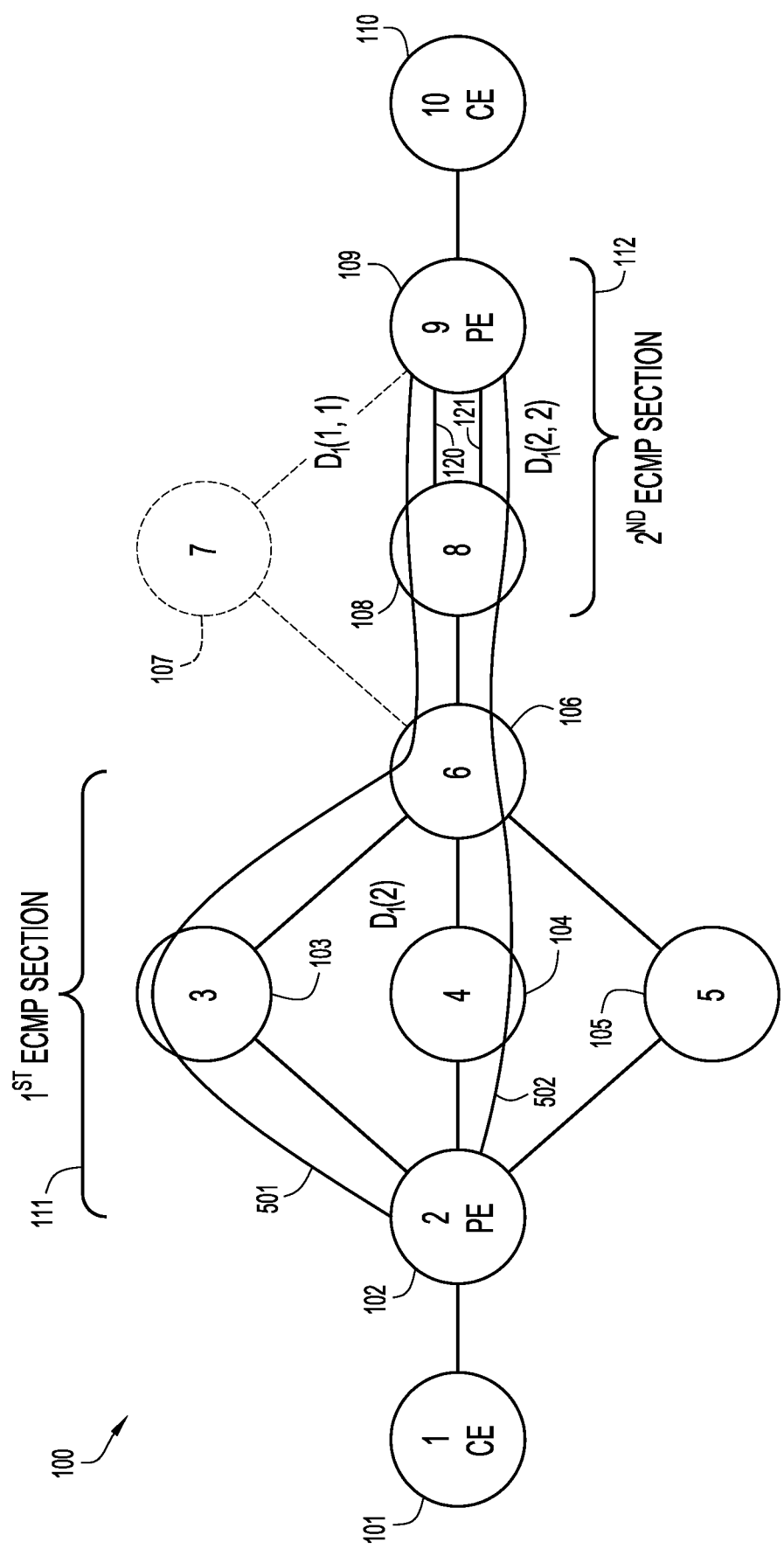
FIG. 5 is a diagram illustrating measurement of delays over ECMP paths of a second ECMP section, according to an example embodiment.

Referring now to FIG. 5, first set of ECMP sections also includes a fourth path 501 over ingress node 102, first transit node 103, fourth transit node 106, sixth transit node 108 (via first link 120), and egress node 109 (e.g., segment list <24123, 24136, 24168, 24189>) and a fifth path 502 over ingress node 102, second transit node 104, fourth transit node 106, sixth transit node 108 (via second link 121), and egress node 109 (e.g., segment list <24124, 24146, 24168, 24289>). Delays over each of these additional paths for the first set of ECMP sections are also measured using probe packets, as described above. For example, using probe packets, delay may be measured over each of fourth path 501 and fifth path 502 through first ECMP section 111 and second ECMP section 112 in series. In this embodiment, measured delay for fourth path 501 is $D_1(1,1)$ and measured delay for fifth path 502 is $D_1(2,2)$.

Figure 6:
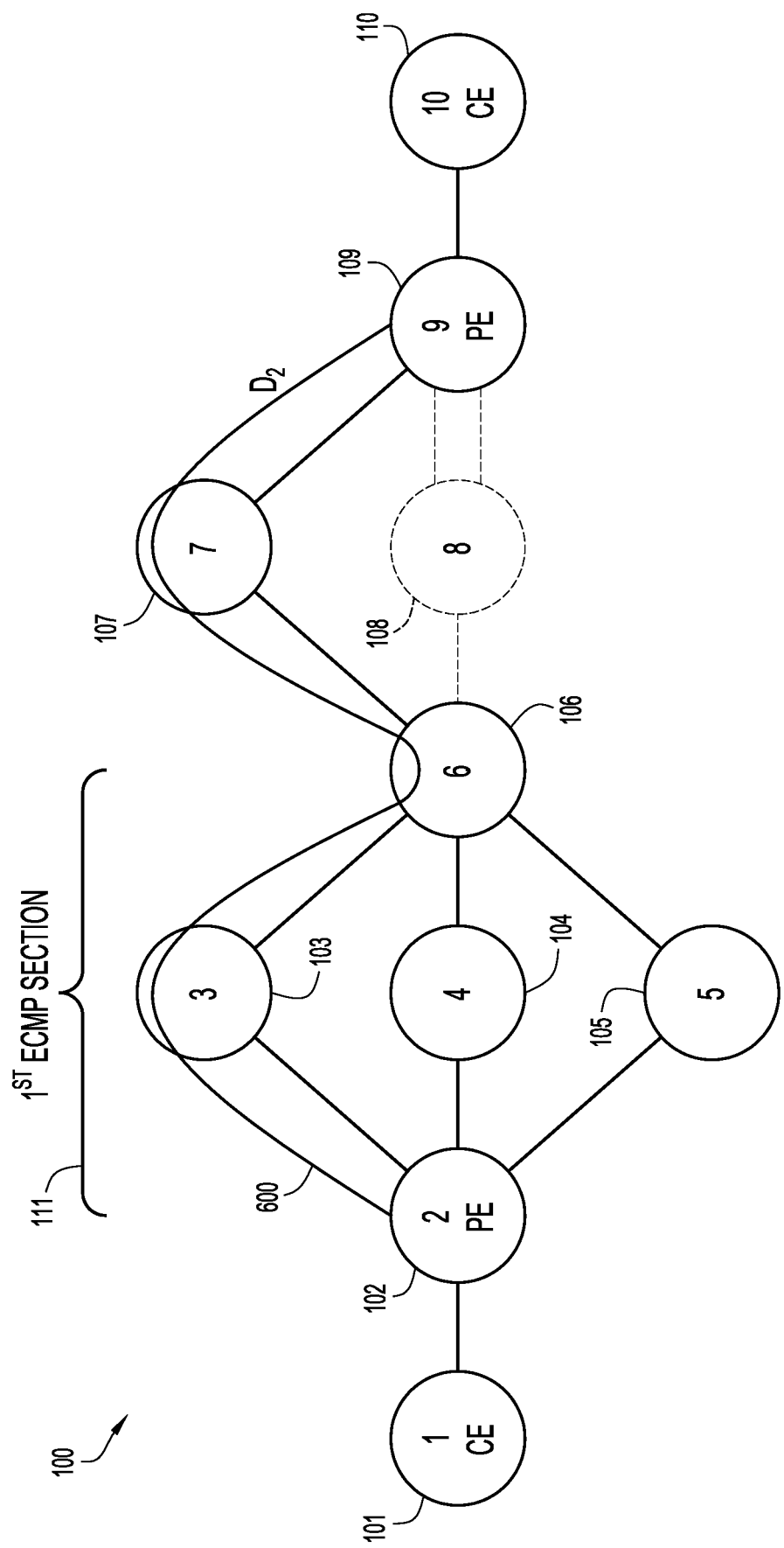
FIG. 6 is a diagram illustrating measurement of delays over ECMP paths of another ECMP section, according to an example embodiment.

As shown in FIG. 6, the second set of ECMP sections includes only one path, sixth path 600 over ingress node 102, first transit node 103, fourth transit node 106, fifth transit node 107, and egress node 109 (e.g., segment list <24123, 24136, 24167, 24179>). Delay over sixth path 600 for the second set of ECMP sections is measured using probe packets, as described above. In this embodiment, measured delay for sixth path 600 is $D_2$.

Upon completion of measuring delay over each of first path 401, second path 402, third path 403, fourth path 501, fifth path 502, and sixth path 600, delay measurements for all end-to-end paths through network 100 may be determined. For example, as shown in FIG. 1, there are 3×3=9 total end-to-end paths through network 100 from ingress node 102 to egress node 109. The delay measurements for all nine end-to-end paths through network 100 from ingress node 102 to egress node 109 are shown in table 700 of FIG. 7.

Referring now to FIG. 7, table 700 includes nine entries, one for each of the end-to-end paths through network 100 from ingress node 102 to egress node 109. For example, table 700 includes a first entry 701 for End-to-End Path 1: ingress node 102, first transit node 103, fourth transit node 106, fifth transit node 107, egress node 109 (i.e., 2-3-6-7-9); a second entry 702 for End-to-End Path 2: ingress node 102, first transit node 103, fourth transit node 106, sixth transit node 108 (via first link 120), egress node 109 (i.e., 2-3-6-$8_1$-9); a third entry 703 for End-to-End Path 3: ingress node 102, first transit node 103, fourth transit node 106, sixth transit node 108 (via second link 121), egress node 109 (i.e., 2-3-6-$8_2$-9); a fourth entry 704 for End-to-End Path 4: ingress node 102, second transit node 104, fourth transit node 106, fifth transit node 107, egress node 109 (i.e., 2-4-6-7-9); a fifth entry 705 for End-to-End Path 5: ingress node 102, second transit node 104, fourth transit node 106, sixth transit node 108 (via first link 120), egress node 109 (i.e., 2-4-6-$8_1$-9); a sixth entry 706 for End-to-End Path 6: ingress node 102, second transit node 104, fourth transit node 106, sixth transit node 108 (via second link 121), egress node 109 (i.e., 2-4-6-$8_2$-9); a seventh entry 707 for End-to-End Path 7: ingress node 102, third transit node 105, fourth transit node 106, fifth transit node 107, egress node 109 (i.e., 2-5-6-7-9); an eighth entry 708 for End-to-End Path 8: ingress node 102, third transit node 105, fourth transit node 106, sixth transit node 108 (via first link 120), egress node 109 (i.e., 2-5-6-$8_1$-9); and a ninth entry 709 for End-to-End Path 9: ingress node 102, third transit node 105, fourth transit node 106, sixth transit node 108 (via second link 121), egress node 109 (i.e., 2-5-6-$8_2$-9).

Using the measured delays over the paths of the first set of ECMP sections and the measured delays over the paths of the second set of ECMP sections, delay measurements for all of the end-to-end paths in table 700 may be determined. These determined delay measurements include a first subset of delay measurements that comprise the measured delays from the probe packets and a second subset of delay measurements that are calculated using different combinations of the measured delays for the plurality of paths of the first set and second set of ECMP sections. For example, the delay measurement for End-to-End Path 1 is $D_2$, which is the measured delay for sixth path 600, the delay measurement for End-to-End Path 2 is $D_1(1,1)$, which is the measured delay for fourth path 501, and the delay measurement for End-to-End Path 6 is $D_1(2,2)$, which is the measured delay for fifth path 502. Thus, delay measurements for End-to-End Path 1, End-to-End Path 2, and End-to-End Path 6 comprise the first subset of delay measurements, where each of the delays is measured directly using probe packets.

The delay measurements for the remaining end-to-end paths are determined by calculating different combinations of the measured delays (e.g., various combinations of $D_1(1)$, $D_1(2)$, $D_1(3)$, $D_1(1,1)$, $D_1(2,2)$, and $D_2$) for each path. Each of the delay measurements for the remaining end-to-end paths is calculated using a unique combination of adding and subtracting the measured delays for the plurality of paths for first set of ECMP sections and second set of ECMP sections. In other words, by adding and subtracting the measured delays for first path 401, second path 402, third path 403, fourth path 501, fifth path 502, and/or sixth path 600 in various combinations, the delay measurements for the remaining end-to-end paths may be calculated, instead of being measured using probe packets.

For example, the delay measurement for End-to-End Path 3 is calculated by subtracting the measured delay for second path 402 from the measured delay for fifth path 502 and adding the measured delay for first path 401 (i.e., $D_1(2,2)-D_1(2)+D_1(1)$). The delay measurement for End-to-End Path 4 is calculated by subtracting the measured delay for first path 401 from the measured delay for sixth path 600 and adding the measured delay for second path 402 (i.e., $D_2-D_1(1)+D_1(2)$). The delay measurement for End-to-End Path 5 is calculated by subtracting the measured delay for first path 401 from the measured delay for fourth path 501 and adding the measured delay for second path 402 (i.e., $D_1(1,1)-D_1(1)+D_1(2)$). The delay measurement for End-to-End Path 7 is calculated by subtracting the measured delay for first path 401 from the measured delay for sixth path 600 and adding the measured delay for third path 403 (i.e., $D_2-D_1(1)+D_1(3)$). The delay measurement for End-to-End Path 8 is calculated by subtracting the measured delay for first path 401 from the measured delay for fourth path 501 and adding the measured delay for third path 403 (i.e., $D_1(1,1)-D_1(1)+D_1(3)$). The delay measurement for End-to-End Path 9 is calculated by subtracting the measured delay for second path 402 from the measured delay for fifth path 502 and adding the measured delay for third path 403 (i.e., $D_1(2,2)-D_1(2)+D_1(3)$).

Thus, in this embodiment, the delay measurements for End-to-End Path 3, End-to-End Path 4, End-to-End Path 5, End-to-End Path 7, End-to-End Path 8, and End-to-End Path 9 comprise the second subset of delay measurements, where each of the delays is calculated using combinations of adding and subtracting the measured delays. As can be seen from table 700, using the techniques of the example embodiments described herein, delay measurements for a total of nine end-to-end paths may be determined using only six measured delays. In other words, the number of measured delays using probe packets scales linearly instead of exponentially, as in the conventional technique.

Referring now to FIG. 8, a diagram of a modified CSPF algorithm 800 for detecting one or more ECMP sections in a network is shown according to an example embodiment. In some embodiments, modified CSPF algorithm 800 is executed a predetermined number of times, wherein the predetermined number is equal to a number of the plurality of nodes in the network. For example, executing algorithm 800 N number of times, where N is the number of nodes in the network topology. The nth time the nth node in the topology is selected as the source node (i.e., s) for the algorithm 800. In an example embodiment, modified CSPF algorithm 800 may be executed only at the beginning of the method for determining end-to-end path delay measurements.

FIG. 9 is a diagram of an example algorithm 900 for determining the ECMP paths through one or more ECMP sections in a network, according to an example embodiment. For example, as described above, algorithm 900 may be used to find the paths that need to be measured for each set of ECMP sections (e.g., first set of ECMP sections shown in FIG. 2 and second set of ECMP sections shown in FIG. 3).

In an example embodiment, algorithm 900 selects paths based on kth set of ECMP sections. Algorithm 900, as shown in FIG. 9, includes the following notations: k is the index of the set of ECMP sections; J is the number of ECMP sections, where the first ECMP section is the closest section to the headend node (e.g., ingress node 102); S(j) is the starting node of the jth ECMP section; E(j) is the ending node of the jth ECMP section; $M_j$ is the number of paths between S(j) and E(j); P(j,m) is the mth path between S(j) and E(j); $Q_k(m1, m2, \ldots, mj)$ is the path from the headend node (e.g., ingress node 102) through P(1,m1), P(2,m2), . . . , and P(j,mj) to E(j); and $D_k(m1, m2, \ldots, mj)$ is the delay over $Q_k(m1, m2, \ldots, mj)$ calculated using the delay measurement procedure described in RFC 6374, cited above, equal to the timestamp at the ingress interface of the last node on $Q_k(m1, m2, \ldots, mj)$ minus the timestamp at the egress interface of the headend node.

Delay measurements are combined at ECMP section ending nodes (i.e., E(j)) to obtain end-to-end path delays. When these measurements are combined, ingress/egress interface queue delays and fabric queue delays at E(j) are taken into account accurately. However, for some end-to-end paths, delay of the queue between ingress timestamping point and the fabric at E(j) may not be correctly taken into account. This error is reduced as each selected path that goes over jth ECMP section uses a different path within (j−1)th ECMP section. That is, algorithm 900 selects $Q_k$ (1+(m % $M_1$), 1+(m % $M_2$), . . . , 1+(m % $M_{j-1}$), m) instead of $Q_k$ (1, 1, . . . , 1, m) for all m, where "%" represents the modulo operator (i.e., "a % b" gives the remainder of a modulo b).

Figure 10:
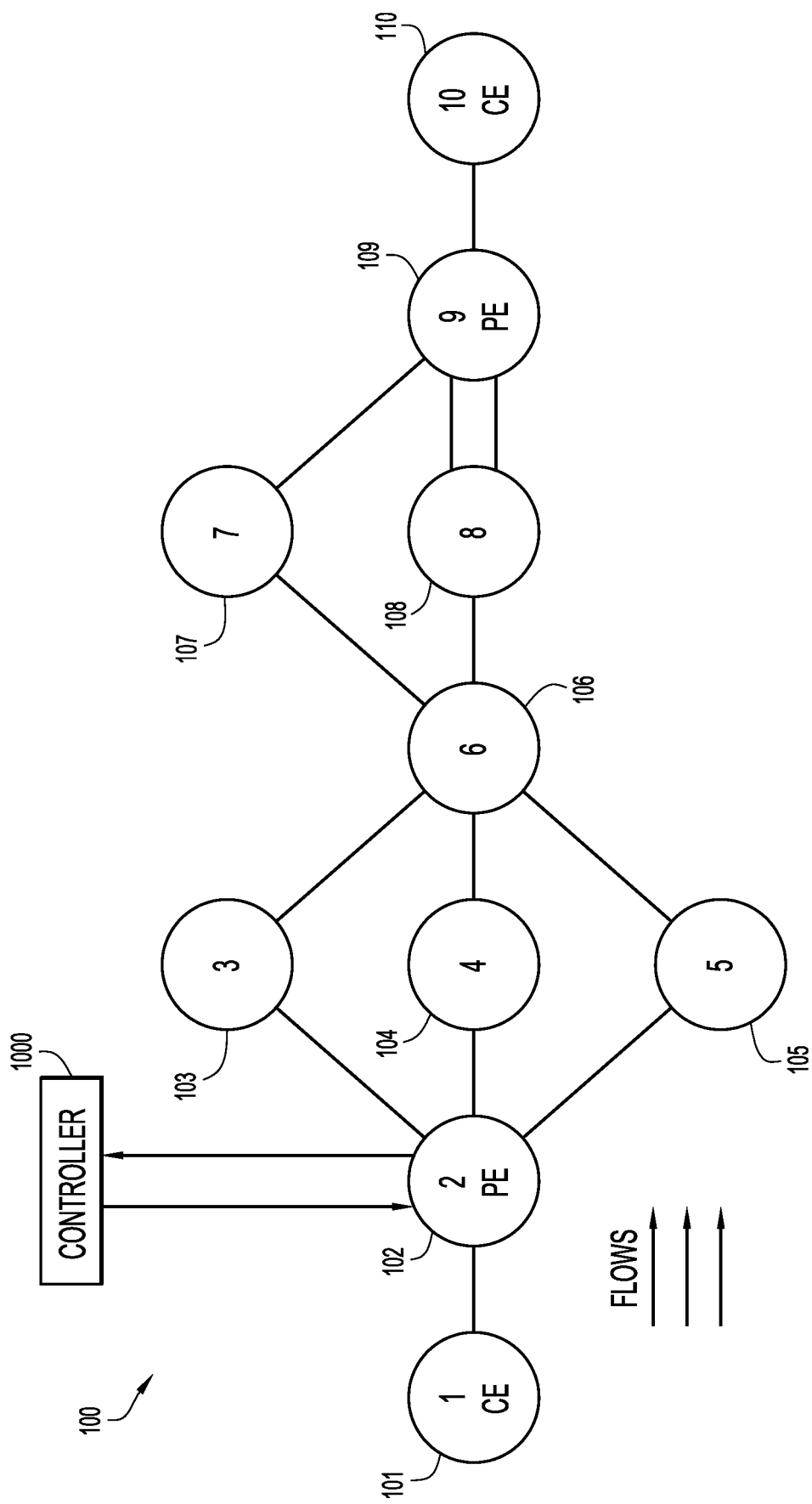
FIG. 10 is a diagram illustrating a controller in a network for implementing end-to-end path delay measurements, according to an example embodiment.

FIG. 10 is a diagram illustrating a controller 1000 in network 100 for implementing end-to-end path delay measurements, according to an example embodiment. In some embodiments, network 100 may further include controller 1000 that provides monitoring, control, and management operations to one or more components of network 100. Controller 1000 is a centralized controller that has a global view of the network topology and paths for network 100. In these embodiments, controller 1000 may be used to identify various ECMP sections for an SR policy (e.g., by executing modified CSPF algorithm 800, described above) and create appropriate PM sessions on the headend node (e.g., ingress node 102).

In some embodiments, the headend node (e.g., ingress node 102) may send a request to controller 1000 to identify various ECMP sections for an SR policy and controller 1000 may reply with a list of ECMP sections to the headend node (e.g., ingress node 102). For example, controller 1000 may provide the headend node (e.g., ingress node 102) with a segment identifier (SID) stack computation for all of the end-to-end paths for the SR policy. Additionally, in some embodiments, controller 1000 may provide updated SID stacks for the end-to-end paths for the SR policy when the network topology changes.

In some embodiments, the headend node (e.g., ingress node 102) may send the delay measurements of the ECMP sections of the SR policy to controller 1000, for example, using Event Driven Telemetry (EDT). In these embodiments, controller 1000 aggregates the delay measurements of different ECMP sections of the SR policy based on the network topology to calculate end-to-end delay measurements for all of the end-to-end paths. Additionally, in some embodiments, controller 1000 may prune some paths in the ECMP sections from the SR policy when the delay metrics for those sections exceed a threshold.

Additionally, when the determined end-to-end delay metrics for an SR policy candidate path exceeds a requested upper-bound (i.e., threshold), the headend node (e.g., ingress node 102) may immediately trigger protection switchover to another candidate path or segment list.

Figure 11:
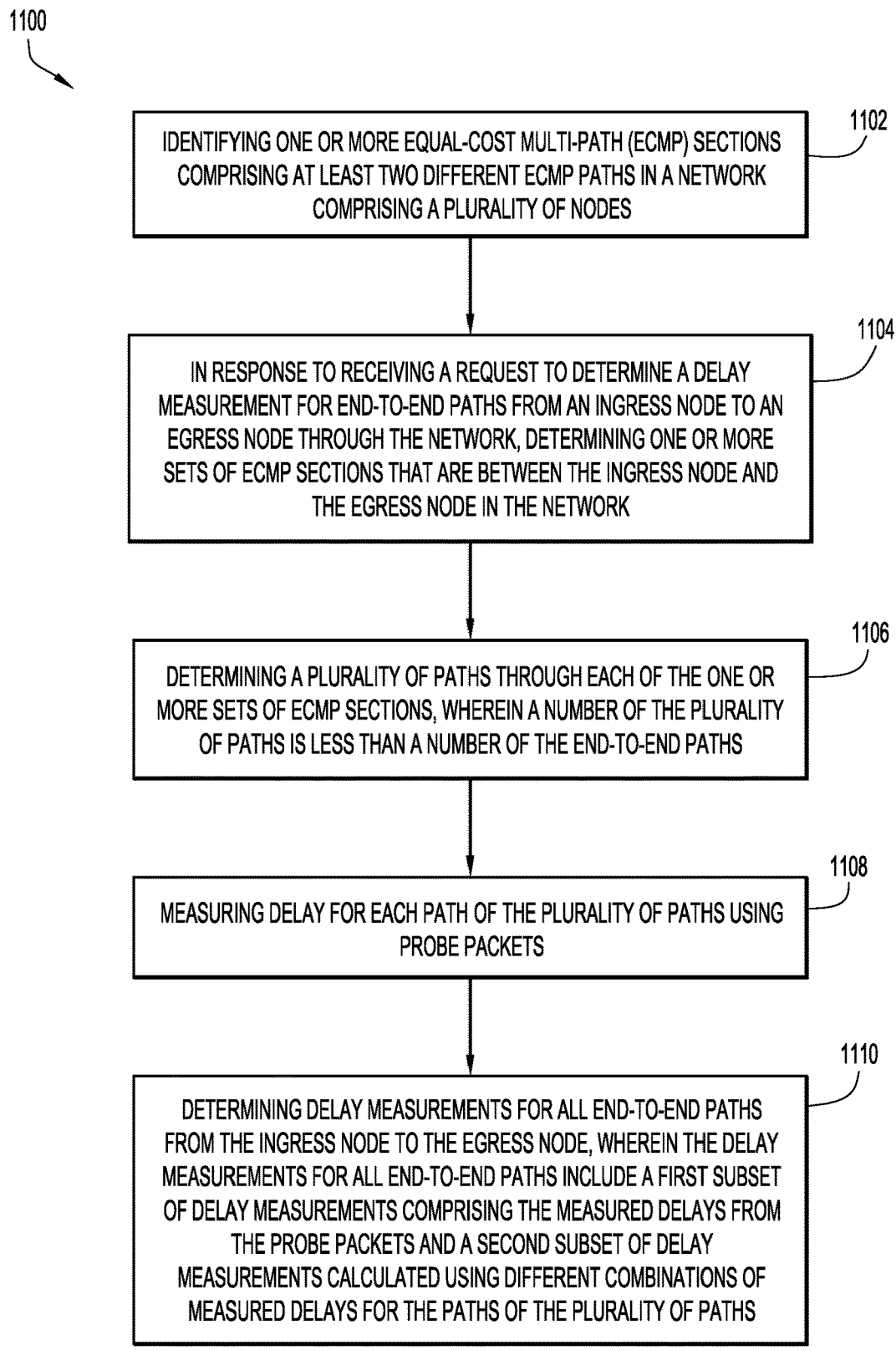
FIG. 11 is a flowchart of a method for determining end-to-end path delay measurements through a network, according to an example embodiment.

FIG. 11 is a flowchart of a method 1100 for determining end-to-end path delay measurements through a network, according to an example embodiment. In some embodiments, method 1100 may be implemented by an apparatus in a network (e.g., network 100), including an ingress node (e.g., ingress node 102) and/or a controller (e.g., controller 1000).

In this embodiment, method 1100 may begin at an operation 1102 where one or more ECMP sections comprising at least two different ECMP paths between nodes are identified in a network that comprises a plurality of nodes. For example, as shown in FIG. 1, three ECMP sections may be identified in network 100, including first ECMP section 111, second ECMP section 112, and third ECMP section 113. In an example embodiment, ECMP sections may be identified using modified CSPF algorithm 800, as described above.

Next, at an operation 1104, in response to receiving a request to determine a delay measurement for end-to-end paths from an ingress node to an egress node through the network, method 1100 includes determining one or more sets of ECMP sections that are between the ingress node and the egress node in the network. For example, in reference to network 100 shown in FIG. 1 above, sets of ECMP sections between ingress node 102 and egress node 109 may be determined. In the previous embodiments, the sets of ECMP sections include a first set of ECMP sections shown in FIG. 2 and a second set of ECMP sections shown in FIG. 3.

Additionally, in some embodiments, the request for delay measurement for the end-to-end paths at operation 1104 may be implemented according to an SR policy that is configured on the ingress node (e.g., ingress node 102) with a destination on the egress node (e.g., egress node 109).

Method 1100 further includes an operation 1106, where a plurality of paths through each of the one or more sets of ECMP sections are determined. For example, in one embodiment, algorithm 900 may be used to determine the plurality of paths through first set of ECMP sections (shown in FIG. 2) and the second set of ECMP sections (shown in FIG. 3). At operation 1106, the number of the plurality of paths that are determined is less than a number of the end-to-end paths in the network for which the delay measurements are to be determined. For example, in the previous embodiments, delay measurements are determined for nine total end-to-end paths and the plurality of paths through the sets of ECMP sections is only six (as shown in FIGS. 4-6).

Next, at an operation 1108, method 1100 includes measuring delay for each path of the plurality of paths determined at operation 1106 using probe packets. For example, delay may be measured for each of first path 401, second path 402, third path 403, fourth path 501, fifth path 502, and sixth path 600 using probe packets as described in reference to RFC 6374.

Method 1100 further includes an operation 1110 where delay measurements for all end-to-end paths from the ingress node to the egress node are determined. For example, table 700 shown in FIG. 7 includes determined delay measurements for all nine end-to-end paths between ingress node 102 and egress node 109. Additionally, the determined delay measurements determined at operation 1110 include a first subset of delay measurements comprising the measured delays from the probe packets and a second subset of delay measurements calculated using different combinations of measured delays for the paths of the plurality of paths. As detailed above in reference to table 700 shown in FIG. 7, the first subset includes measured delays for End-to-End Path 1, End-to-End Path 2, and End-to-End Path 6 that were measured directly using probe packets and the second subset includes calculated delays for End-to-End Path 3, End-to-End Path 4, End-to-End Path 5, End-to-End Path 7, End-to-End Path 8, and End-to-End Path 9 that were calculated using combinations of adding and subtracting the measured delays.

Upon performing method 1100 to determine end-to-end delay metrics, a responsive action may be taken, for example, by controller 1000 and/or one or more nodes, including ingress node 102. Responsive actions include, but are not limited to: changing a path for a packet flow (e.g., a path protection switchover), signal a failure to a network administrator or other controller, instantiate a new path between nodes, diverting traffic, implementing a new policy, as well as other actions that may mitigate or correct any delay metrics determined based on end-to-end delay measurement techniques described herein.

Figure 12:
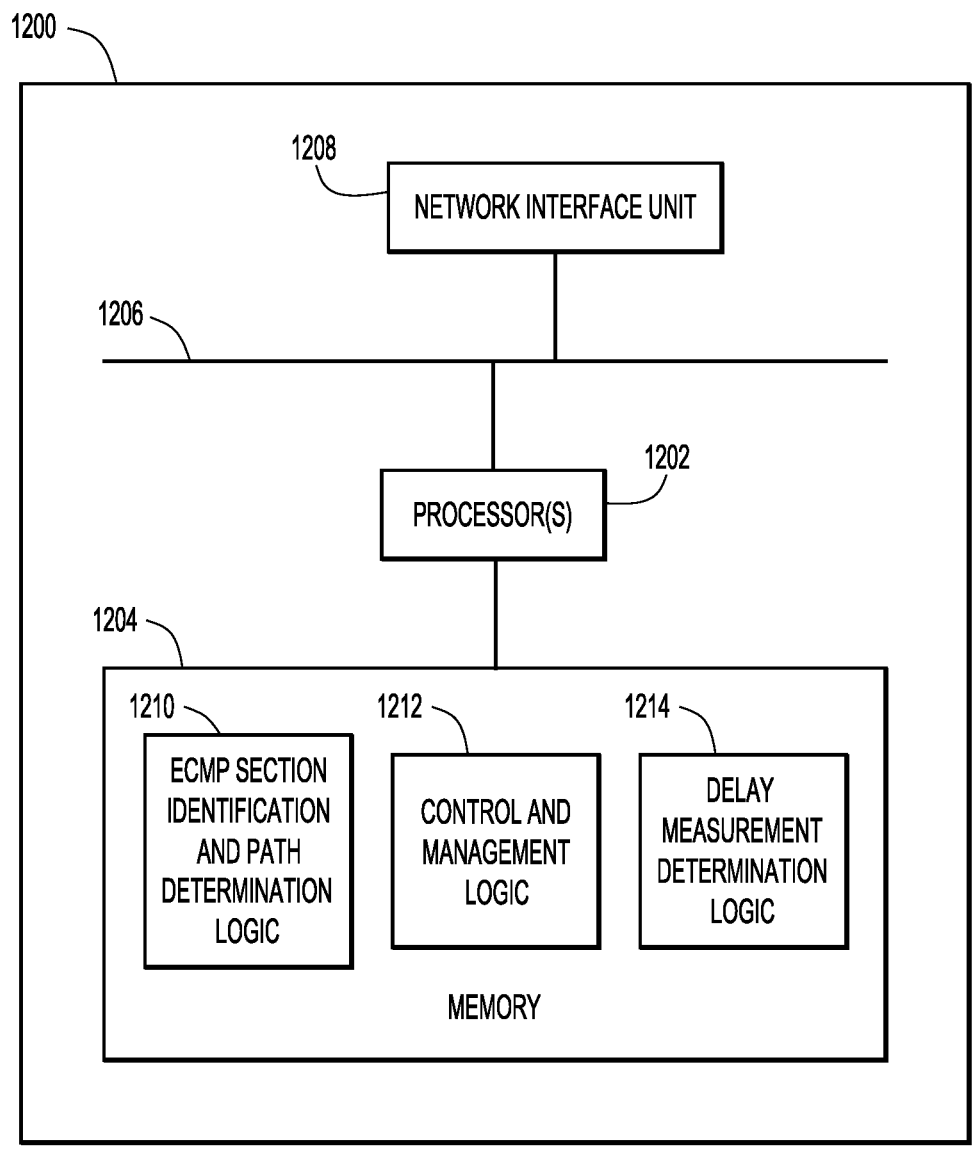
FIG. 12 is a block diagram of an apparatus for implementing end-to-end path delay measurements in a network, according to an example embodiment.

FIG. 12 is a block diagram of an apparatus 1200 for implementing end-to-end path delay measurements in a network, according to an example embodiment. In some embodiments, apparatus 1200 may be a controller (e.g., controller 1000) and/or an ingress node in a network (e.g., ingress node 102). The apparatus 1200 includes one or more processors 1202, memory 1204, a bus 1206 and a network interface unit 1208, such as one or more network interface cards that enable network connectivity. Network interface unit 1208 may also include a plurality of network ports (not shown), which may include uplink and/or downlink ports, at which ingress traffic is received at apparatus 1200 and from which egress traffic is transmitted from apparatus 1200.

The memory 1204 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 1204 may comprise one or more tangible (non-transitory) computer readable storage media (e.g., a memory device) encoded with software comprising computer executable instructions and when the software is executed (by the processor 1202) it is operable to perform the operations described herein. For example, memory 1204 may include instructions for implementing one or more of an ECMP section identification and path determination logic 1210, control and management logic 1212, and/or a delay measurement determination logic 1214 to implement various operations of ingress node 102 and/or controller 1000 described above in reference to FIGS. 1-11.

In some embodiments, memory 1204 may store instructions for control and management logic 1212, that when executed by the processor 1202, cause the processor to perform the software defined network controller operations described herein, including operations associated with configuring an SR policy for end-to-end delay measurement, described above.

In an example embodiment, ECMP section identification and path determination logic 1210 may include one or more operations for identifying ECMP sections in the network topology, for example, executing modified CSPF algorithm 800, and also may include operations for determining paths through the sets of one or more ECMP sections, for example, executing algorithm 900, as described above, when executed by processor 1202.

In an example embodiment, delay measurement determination logic 1214 may include one or more operations for determining measured delay for one or more paths using probe packets, as well as determining delay measurements for all end-to-end paths, including both measured and calculated delay measurements, as described above, when executed by processor 1202.

In an example embodiment, delay measurement determination logic 1214 at apparatus 1200 (e.g., ingress node 102 or controller 1000) may include Return Path information, for example, in the form of a list of SR-MPLS or SRv6 Segment Identifiers of the reverse direction end-to-end path, added in the probe query messages. The Return Path may be carried in the header or payload (e.g., as a type-length-value (TLV)) of the probe messages. When the Return Path is included in the probe message header, the probe message is not punted on the responder node, further improving the scale. The Return Path provided in the probe query message received is used to send probe response messages back to the headend node (e.g., ingress node 102). The Return Path allows measurement of two-way delay for the end-to-end path. The two-way delay includes the delay in both the forward direction and in the reverse direction of the end-to-end path. One-way delay of the end-to-end path then may be derived as two-way delay divided by two. Measuring two-way delay does not require clocks to be synchronized between the probe querying node (i.e., headend node/ingress node 102) and responder nodes. Both the forward and/or return end-to-end path may be computed by apparatus 1200 (e.g., headend node/ingress node 102 and/or controller 1000).

A headend node (e.g., ingress node 102) may contain a number of SR policies. An SR policy may contain multiple candidate-paths. Each candidate-path may contain multiple segment lists. Each segment-list can result in a number of end-to-end paths due to ECMP paths present on ingress node (e.g., ingress node 102) and/or transit nodes (e.g., one or more of transit nodes 103-108). This can result in duplicated paths for an SR policy or across multiple SR policies for which delay measurement is requested. The headend node (e.g., ingress node 102) can detect such duplicated paths and measure delay only on unique paths of the SR policies to further improve the scale.

According to the techniques for determining end-to-end path delay measurements presented herein, the required number of delay measurements increases linearly, rather than exponentially, with the number of ECMP sections in the end-to-end path. As a result, the time required to determine end-to-end delay over all end-to-end paths is significantly reduced compared with conventional techniques. In addition, the techniques described herein follow SR philosophy so that only the headend node creates and maintains PM sessions and the transit nodes are stateless. The example embodiments utilize existing PM infrastructure without requiring changes so that no additional protocol extensions are needed to implement the techniques described herein.

The principles of the example embodiments described herein provide tight latency adherence that is required in 5G networks, as the techniques provide absolute knowledge of latency for every customer. Additionally, telemetry is able to use delay measurements determined in accordance with the embodiments described herein to provide visibility and assurance of network operations, especially with over-the-top (OTT) technologies, such as Software Defined WAN (Wide Area Network) monitoring overlay delay.

The techniques for determining end-to-end path delay measurements presented herein measures end-to-end path delays of SR policies in both SR-MPLS and SRv6 data planes. These techniques include determining unique sets of paths over which delays need to be measured. The number of paths in this set increases linearly (thus, is scalable) with the number of ECMP sections, as opposed to increasing exponentially in the conventional techniques. Unlike the conventional techniques, all the paths in these sets start from a headend node where the SR policy is configured. This characteristic of the paths results in several benefits, including, but not limited to: transit nodes in the path specified by the segment list do not have to create and maintain PM sessions (i.e., stateless transit nodes), addition protocol extensions are not needed to exchange delay measurements among nodes, and existing PM infrastructure can be used without changes.

In one form, a method is provided comprising: identifying one or more equal-cost multi-path (ECMP) sections comprising at least two different ECMP paths in a network comprising a plurality of nodes; in response to receiving a request to determine a delay measurement for end-to-end paths from an ingress node to an egress node through the network, determining one or more sets of ECMP sections that are between the ingress node and the egress node in the network; determining a plurality of paths through each of the one or more sets of ECMP sections, wherein a number of the plurality of paths is less than a number of the end-to-end paths; measuring delay for each path of the plurality of paths using probe packets; and determining delay measurements for all end-to-end paths from the ingress node to the egress node, wherein the delay measurements for all end-to-end paths include a first subset of delay measurements comprising the measured delays from the probe packets and a second subset of delay measurements calculated using different combinations of measured delays for the paths of the plurality of paths.

In another form, one or more non-transitory computer readable storage media encoded with instructions are provided that, when executed by a processor of an ingress node in a network comprising a plurality of nodes, cause the processor to: identify one or more equal-cost multi-path (ECMP) sections comprising at least two different ECMP paths in the network; in response to receiving a request to determine a delay measurement for end-to-end paths from the ingress node to an egress node through the network, determine one or more sets of ECMP sections that are between the ingress node and the egress node in the network; determine a plurality of paths through each of the one or more sets of ECMP sections, wherein a number of the plurality of paths is less than a number of the end-to-end paths; measure delay for each path of the plurality of paths using probe packets; and determine delay measurements for all end-to-end paths from the ingress node to the egress node, wherein the delay measurements for all end-to-end paths include a first subset of delay measurements comprising the measured delays from the probe packets and a second subset of delay measurements calculated using different combinations of measured delays for the paths of the plurality of paths.

In yet another form, a system is provided comprising: a network including a plurality of nodes; and an apparatus comprising: a plurality of network ports configured to receive inbound packets and to send outbound packets; a memory; a processor coupled to the memory and to the plurality of network ports, wherein the processor is configured to: identify one or more equal-cost multi-path (ECMP) sections comprising at least two different ECMP paths in the network; in response to receiving a request to determine a delay measurement for end-to-end paths from an ingress node to an egress node through the network, determine one or more sets of ECMP sections that are between the ingress node and the egress node in the network; determine a plurality of paths through each of the one or more sets of ECMP sections, wherein a number of the plurality of paths is less than a number of the end-to-end paths; measure delay for each path of the plurality of paths using probe packets; and determine delay measurements for all end-to-end paths from the ingress node to the egress node, wherein the delay measurements for all end-to-end paths include a first subset of delay measurements comprising the measured delays from the probe packets and a second subset of delay measurements calculated using different combinations of measured delays for the paths of the plurality of paths.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   identifying one or more equal-cost multi-path (ECMP) sections comprising at least two different ECMP paths in a network comprising a plurality of nodes;
   in response to receiving a request to determine a delay measurement for end-to-end paths from an ingress node to an egress node through the network, determining one or more sets of ECMP sections that are between the ingress node and the egress node in the network by decomposing a nested ECMP section that includes an ECMP section within an ECMP section to eliminate ECMP paths from the nested ECMP section, such that the one or more sets of ECMP sections do not include the nested ECMP section;
   determining a plurality of paths through each of the one or more sets of ECMP sections, wherein a number of the plurality of paths is less than a number of the end-to-end paths;
   measuring delay for each path of the plurality of paths using probe packets; and
   determining delay measurements for all end-to-end paths from the ingress node to the egress node, wherein the delay measurements for all end-to-end paths include a first subset of delay measurements comprising the measured delays from the probe packets and a second subset of delay measurements calculated using different combinations of measured delays for the paths of the plurality of paths.

2. The method of claim 1, wherein at least one set of the one or more sets of ECMP sections includes at least two ECMP sections in series.

3. The method of claim 1, wherein the probe packets are defined according to a One-Way Active Measurement Protocol (OWAMP) and/or a Two-Way Active Measurement Protocol (TWAMP).

4. The method of claim 1, wherein identifying one or more ECMP sections in the network comprises using a Constrained Shortest Path First (CSPF) algorithm.

5. The method of claim 4, further comprising executing the CSPF algorithm a predetermined number of times, wherein the predetermined number is equal to a number of the plurality of nodes in the network.

6. The method of claim 1, wherein at least one path of the plurality of paths through each of the one or more sets of ECMP sections is a path from the ingress node to a transit node.

7. The method of claim 1, wherein the end-to-end paths are atomic paths comprising ECMP paths and/or non-ECMP paths.

8. The method of claim 1, wherein the delay measurements are determined by the ingress node.

9. The method of claim 1, wherein the one or more ECMP sections in the network are identified by a network controller for the network using network topology information.

10. The method of claim 1, wherein a number of the first subset of delay measurements comprising the measured delays from the probe packets increases linearly with a number of the ECMP sections.

11. One or more non-transitory computer readable storage media encoded with instructions that, when executed by a processor of an ingress node in a network comprising a plurality of nodes, cause the processor to:
    identify one or more equal-cost multi-path (ECMP) sections comprising at least two different ECMP paths in the network;
    in response to receiving a request to determine a delay measurement for end-to-end paths from the ingress node to an egress node through the network, determine one or more sets of ECMP sections that are between the ingress node and the egress node in the network by decomposing a nested ECMP section that includes an ECMP section within an ECMP section to eliminate ECMP paths from the nested ECMP section, such that the one or more sets of ECMP sections do not include the nested ECMP section;
    determine a plurality of paths through each of the one or more sets of ECMP sections, wherein a number of the plurality of paths is less than a number of the end-to-end paths;
    measure delay for each path of the plurality of paths using probe packets; and
    determine delay measurements for all end-to-end paths from the ingress node to the egress node, wherein the delay measurements for all end-to-end paths include a first subset of delay measurements comprising the measured delays from the probe packets and a second subset of delay measurements calculated using different combinations of measured delays for the paths of the plurality of paths.

12. The one or more non-transitory computer readable storage media of claim 11, wherein at least one set of the one or more sets of ECMP sections includes at least two ECMP sections in series.

13. The one or more non-transitory computer readable storage media of claim 11, wherein identifying one or more ECMP sections in the network comprises using a Constrained Shortest Path First (CSPF) algorithm.

14. The one or more non-transitory computer readable storage media of claim 13, wherein the instructions further cause the processor to execute the CSPF algorithm a predetermined number of times, wherein the predetermined number is equal to a number of the plurality of nodes in the network.

15. The one or more non-transitory computer readable storage media of claim 11, wherein the end-to-end paths are atomic paths comprising ECMP paths and/or non-ECMP paths.

16. A system comprising:
a network including a plurality of nodes; and
an apparatus comprising:
a plurality of network ports configured to receive inbound packets and to send outbound packets;
a memory;
a processor coupled to the memory and to the plurality of network ports, wherein the processor is configured to:
identify one or more equal-cost multi-path (ECMP) sections comprising at least two different ECMP paths in the network;
in response to receiving a request to determine a delay measurement for end-to-end paths from an ingress node to an egress node through the network, determine one or more sets of ECMP sections that are between the ingress node and the egress node in the network by decomposing a nested ECMP section that includes an ECMP section within an ECMP section to eliminate ECMP paths from the nested ECMP section, such that the one or more sets of ECMP sections do not include the nested ECMP section;
determine a plurality of paths through each of the one or more sets of ECMP sections, wherein a number of the plurality of paths is less than a number of the end-to-end paths;
measure delay for each path of the plurality of paths using probe packets; and
determine delay measurements for all end-to-end paths from the ingress node to the egress node, wherein the delay measurements for all end-to-end paths include a first subset of delay measurements comprising the measured delays from the probe packets and a second subset of delay measurements calculated using different combinations of measured delays for the paths of the plurality of paths.

17. The system of claim 16, wherein at least one set of the one or more sets of ECMP sections includes at least two ECMP sections in series.

18. The system of claim 16, wherein the processor is configured to identify the one or more ECMP sections in the network using a Constrained Shortest Path First (CSPF) algorithm that is executed a predetermined number of times, wherein the predetermined number is equal to a number of the plurality of nodes in the network.

19. The system of claim 16, wherein the end-to-end paths are atomic paths comprising ECMP paths and/or non-ECMP paths.

20. The system of claim 16, wherein the apparatus is the ingress node.

21. The system of claim 16, wherein the apparatus is a network controller for the network, and wherein the network controller identifies the one or more ECMP sections in the network using network topology information.

* * * * *